US 6,600,799 B1

(12) United States Patent
Kreuter

(10) Patent No.: US 6,600,799 B1
(45) Date of Patent: Jul. 29, 2003

(54) FUEL ELEMENT WITH FUEL RODS FOR A BOILING WATER REACTOR

(75) Inventor: Dieter Kreuter, Rödermark (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 09/668,702

(22) Filed: Sep. 25, 2000

(30) Foreign Application Priority Data

Sep. 24, 1999 (DE) .......................... 199 45 902

(51) Int. Cl.⁷ .................................. G21C 3/32
(52) U.S. Cl. .................. 376/435; 376/434; 376/438; 376/349
(58) Field of Search .................. 376/438, 435, 376/448, 462, 434, 446, 349

(56) References Cited

U.S. PATENT DOCUMENTS

| | | | |
|---|---|---|---|
| 4,495,136 A | 1/1985 | Camden, Jr. et al. | 376/172 |
| 4,585,614 A | 4/1986 | Helmersson | 376/434 |
| 4,781,885 A * | 11/1988 | Lill et al. | 376/444 |
| 4,849,161 A | 7/1989 | Brown et al. | 376/439 |
| 5,094,805 A | 3/1992 | Suchy et al. | 376/438 |
| 5,128,097 A * | 7/1992 | Fukasawa et al. | 376/438 |
| 5,289,514 A | 2/1994 | Lippert et al. | 376/440 |
| 5,383,229 A | 1/1995 | Nakajima et al. | 376/434 |
| 5,434,898 A | 7/1995 | Barkhurst | 376/435 |
| 5,572,560 A * | 11/1996 | Brown | 376/435 |

FOREIGN PATENT DOCUMENTS

| | | |
|---|---|---|
| DE | 1589472 | 2/1971 |
| DE | 2129809 | 3/1972 |
| EP | 0196655 A1 | 10/1986 |
| EP | 0224728 B1 | 6/1987 |
| EP | 0373418 B1 | 6/1990 |
| EP | 0458086 B1 | 8/1995 |
| EP | 0713600 B1 | 10/1997 |
| FR | 1276233 | 10/1961 |

* cited by examiner

Primary Examiner—Michael J. Carone
Assistant Examiner—Daniel Matz
(74) Attorney, Agent, or Firm—Laurence A. Greenberg; Werner H. Stemer; Ralph E. Locher

(57) ABSTRACT

For the redistribution of a coolant flow from a first region into a second region, in particular in boiling-water-reactor fuel elements having an eccentrically disposed water passage, a fuel-rod bundle is constructed in a mirror symmetry manner relative to a diagonal. A distance between adjacent fuel rods increases monotonically in particular along a diagonal. In addition, a fuel-rod bundle as an entity may be offset eccentrically along the diagonal. To compensate for asymmetry in the reactor core, a redistribution of coolant is provided which is advantageous in pressurized-water-reactor fuel elements.

18 Claims, 4 Drawing Sheets

FUEL ELEMENT WITH FUEL RODS FOR A BOILING WATER REACTOR

BACKGROUND OF THE INVENTION

Field of the Invention

The invention relates to a fuel element having fuel rods disposed substantially parallel to a fuel-element axis and substantially perpendicularly to a polygonal internal cross section perpendicular to the fuel-element axis. In this case, in a first region, a ratio of the free area of the internal cross section to the area through which the fuel rods pass is smaller than in a second region.

To improve the thermohydraulics and a neutron economy in a fuel element, it is known that a distance between the fuel rods—in particular in relation to a radius of the encasing tube—can be set variable, but so as to be constant for a fuel element (see European Patent EP 0 373 418 B1). This serves in particular to reduce the pressure loss, improve the moderation ratio and reduce the neutron absorption by the structure material. In this case, it is advantageous if a situation which is as homogeneous as possible with regard to the thermohydraulics and the neutron economy can be achieved over the cross section of the reactor core and in particular over the cross section of one fuel element.

However, this is not the case as a rule, but rather the thermohydraulic and neutron-economy properties of the reactor core have considerable inhomogeneity and asymmetry.

Such inhomogeneity or asymmetry may occur, for example, in a pressurized-water fuel element due to the configuration of control rods, instrumentation tubes or other tubes without fuel. In a boiling-water-reactor fuel element, the configuration of the control rods between adjacent fuel elements may, for example, be the cause of an anisotropic neutron flow. Inhomgeneity and asymmetry may also occur in light-water reactors and/or light-water-reactor fuel elements, for example, due to a distribution of differently enriched fuel rods, and/or fuel rods provide neutron absorption, over the cross section of the fuel element.

To remove this or similar inhomogeneity, various measures which take into account the cause of inhomogeneity are known. For example, it is known according to U.S. Pat. No. 5,094,805, in a pressurized-water-reactor fuel element, to make the distance between a control rod and a fuel rod adjacent to the control rod smaller than a distance between two adjacent fuel rods.

Such a measure normally results in an essentially centrosymmetrical distribution of the fuel rods, which brings about the removal of inhomogeneity caused by a centrosymmetrical distribution of the control rods.

A similar approach is specified in Published, European Patent Application EP 0 196 655 A1 for a pressurized-water-reactor fuel element, in which the cross section of the fuel rod adjacent a control rod is reduced and thus the fuel quantity in the vicinity of a control rod is reduced. The distance of the fuel rod from an adjacent control rod increases as a result. Here, too, there is an essentially centrosymmetrical size and/or distance distribution of the fuel rods for removing essentially centrosymmetrical inhomogeneity (e.g. see FIG. 6 in EP 0 196 655).

An essentially centrosymmetrical fuel and/or encasing-tube size distribution is also provided for a boiling-water-reactor fuel element (see FIG. 5 in EP 0 196 655). In this case, there is a slight deviation merely at a marginal edge of such a boiling-water-reactor fuel element in order to compensate for the inhomogeneity which is caused by an adjacent control rod in the center of a group of four of such boiling-water-reactor fuel elements.

The hitherto known measures for removing inhomogeneities in the thermohydraulics and/or the neutron economy therefore relate essentially to centrosymmetrical distributions of fuel-rod distances and/or sizes, at most with locally limited deviations from the centrosymmetry which serve to remove highly localized effects—for example at the margin of a boiling-water-reactor fuel element due to a control rod.

However, inhomogeneity of the thermohydraulics and neutron economy of a ligh-water-reactor fuel element cannot always be removed in a satisfactory manner with an essentially centrosymmetrical or highly localized variation in a fuel-rod cross section or a distance between adjacent fuel rods. This is because the spatial range of a measure usually cannot be locally restricted in its effects and is in addition possibly different for the thermohydraulics and neutron economy.

The reason for this is that, if such a measure is taken, because, for example, the neutron flow is to be influenced in a certain sense via the volumetric ratio of moderator to fuel, the flow resistance and the flow distribution, via the cross sections of flow available for the coolant, will at the same time also be influenced to an extent which is possibly not optimal. Increased moderation in a region of the fuel element can lead there to a higher output and to greater formation of steam, for the rapid removal of which a higher flow velocity than can be achieved by an increase in the fuel-rod distance would be desirable.

SUMMARY OF THE INVENTION

It is accordingly an object of the invention to provide a fuel element with fuel rods for a boiling water reactor that overcomes the above-mentioned disadvantages of the prior art devices of this general type.

With the foregoing and other objects in view there is provided, in accordance with the invention, a fuel element including a fuel element body having a fuel element axis, a polygonal internal cross section perpendicular to the fuel-element axis, a first region, and a second region; and fuel rods having outer surfaces disposed substantially parallel to the fuel-element axis and substantially perpendicularly to the polygonal internal cross section in the fuel element body. In the first region, a ratio of a free area of the polygonal internal cross section to an area through which the fuel rods pass in the first region is smaller than in the second region. The first region forms a first corner of the polygonal internal cross section and the second region forms second corners of the polygonal internal cross section. And a distance between the outer surfaces of in each case two adjacent ones of the fuel rods increases monotonically in one direction starting from the first corner of the fuel element body.

The object of the invention is to specify a light-water-reactor fuel element that has both improved thermohydraulics and an improved neutron economy.

The object is achieved according to the invention by a fuel element of the type mentioned at the beginning in that the first region forms a first corner of the internal cross section, and other corners of the internal cross section are formed by the second region. In addition, the distance between the outer surfaces of in each case two adjacent fuel rods increases montonically—in one direction starting from the first corner of the fuel element. This is the case in particular along a diagonal and/or a side of the internal cross section.

In this case, a fuel rod is disposed virtually perpendicularly to the polygonal internal cross section and passes through the latter with the fuel-rod cross-sectional area. There is thus a free area, accessible to the cooling water, of the internal cross section and an area of the internal cross section through which fuel rods pass.

The invention is based on the knowledge that, to achieve the object, it is favorable to effect a redistribution of the coolant flow and moderator flow in a light-water-reactor fuel element of the type mentioned at the beginning from the first region toward the second region. The object is achieved by a reduction in the free area in the first region and by the configuration of the first region in the first corner of the internal cross section in the fuel element mentioned at the beginning. This is favorable in the case of a coolant flow that is virtually a two-phase flow, that is a flow having a high steam portion (e.g. up to about 40% to 50%). In the case of such a two-phase flow, as occurs in particular in a boiling-water-reactor fuel element, the steam in particular will escape into the second region, since the steam has a smaller mass moment of inertia than the liquid portion of the coolant flow. This effect is to be assisted and intensified by the fuel element of the above-mentioned type according to the invention.

Even in the case of a coolant flow having a comparatively small steam portion (e.g. up to 5%), which forms virtually a single-phase flow, as occurs, for example, in a pressurized-water-reactor fuel element, the above-described fuel element according to the invention is favorable, since the liquid coolant is also displaced from the first region into the second region. In particular, therefore, asymmetrical inhomogeneity in the fuel element and/or a reactor core can be compensated for by the asymmetrical configuration of the first and second regions in a fuel element of the above-mentioned type according to the invention.

It proves to be especially advantageous for the distance between the outer surfaces of in each case two adjacent fuel rods to be made smaller on average in the first region than in the second region. In particular, the distance between the fuel rods in the first region will therefore be smaller on average than in the second region. In this way, the coolant (to be precise mainly the steam portion in the coolant) is displaced from the first region into the second region.

With regard to the monotonically increasing distance between the outer surfaces of in each case two adjacent fuel rods, it is favorable that the fuel rods of the fuel element have an identical diameter, the distance between the outer surfaces of in each case two adjacent fuel rods being variable in the above-mentioned manner. It is likewise advantageous that the fuel rods have an identical distance between centers and the diameter of the fuel rods is variable. In this case, for example, the fuel rods in the first region may have a larger fuel-rod diameter than in the second region.

In a development of the invention, for example, a first fuel rod which sits nearest to the first corner on the diagonal may have a relatively small distance between its outer surface and the outer surface of a second adjacent fuel rod on the diagonal. The distance of the outer surface of the second fuel rod on the diagonal from the outer surface of a third adjacent fuel rod on the diagonal may then be just as large as or larger than the distance between the outer surfaces of the first and the second fuel rod. It is especially advantageous if the distance between in each case two adjacent fuel rods, starting from the first corner of the fuel element, increases in one direction in accordance with a linear, convex or concave function of the path covered in said direction. In this way, the distance between the outer surfaces of the penultimate fuel rod and the last fuel rod on the diagonal in the vicinity of the corner opposite the first corner is greater than the distance between the outer surfaces of the first and the second fuel rod on the diagonal.

In a favorable manner, the configuration of the fuel rods over the internal cross section in this case is substantially in mirror symmetry relative to a diagonal, starting from the first corner, of the internal cross section. In particular, a substantially square internal cross section proves to be advantageous. However, it is also possible, for example, for there to be a hexagonal internal cross section.

In a development of the invention, the fuel rod adjacent to the first side, starting from the first corner, is at a distance from the first side of the internal cross section which is smaller than a distance of a fuel rod adjacent to a second side from the second side of the internal cross section. With this possibility, a center axis of the fuel-rod bundle composed of fuel rods may thus favorably be offset laterally from the center of the internal cross section and its boundary may be at a larger distance from a first side starting from the first corner than from a second side which does not start from the first corner. In the manner just referred to, a fuel-rod bundle may thus be disposed in such a way that it passes eccentrically through the internal cross section of a fuel element.

However, in a further possibility, it is also favorable if a distance between the outer surfaces of in each case two adjacent fuel rods is on average smaller in the first region than in the second region, in particular in one of the above-mentioned developments of the invention, and if in this case the fuel-rod bundle as an entity passes centrally through the internal cross section of the fuel element.

Both above-mentioned possibilities are advantageously combined with one another, so that a ratio of a free area of the internal cross section to the area through which fuel rods pass is smaller in a first region than in a second region, and the first region forms a first corner of the internal cross section and other corners are formed by the second region.

In particular, a fuel element in a development of the invention has a water-tube configuration that is virtually parallel to the fuel rods. For example, this may be a fuel element in accordance with French Patent FR 1.276.233, or in accordance with Published, Non-Prosecuted German Patent Application DE 21 29 809 A1. In particular, it may also be a fuel element in accordance with U.S. Pat. No. 5,289,514 or also a fuel element in accordance with European Patent EP 0 224 728 B1. In particular in the case of the two last-mentioned embodiments of the fuel element, this is a fuel element having a water tube, which passes centrally through the internal cross section. The water-tube configuration need not always consist of a single round or rectangular water tube; on the contrary, other cross sections (e.g. cross-shaped) or configurations having a plurality of tubes are also possible (see, for example, EP 0 458 086 B1). A fuel element of the above-mentioned type having a water-tube configuration which is substantially parallel to the fuel rods and is laterally offset from the fuel-element axis, as described, for example, in European Patent EP 0 713 600 B1 or International Patent Disclosure WO95/04992, also proves to be particularly favorable.

In this case, in particular the first region is polygonal and borders a water-tube configuration with a corner lying opposite the first corner. The first region is advantageously square. In addition, the second region is advantageously polygonal and has a section that forms a corner opposite the first corner. In this section, the ratio of the free area of the internal cross section to the area through which the fuel rods pass is advantageously greater than in another section having a similar area of the internal cross section.

In the developments of the invention which have just been referred to, in particular in a fuel element having the water-tube configuration laterally offset from the fuel-element axis, the first region is therefore disposed essentially on the diagonal on that side of the water-tube configuration on which the center axis of the water-tube configuration is at a smaller distance from the margin of the internal cross section. The second region contains virtually the remaining internal cross section of the fuel element, in which case the section, in which the ratio of the free area of the internal cross section to the area through which fuel rods pass is greatest, is disposed essentially on the diagonal and on that side of the water-tube configuration on which the center axis of the water-tube configuration is at the greater distance from the margin of the internal cross section.

In a further refinement of the fuel element according to the invention, the fuel rods are disposed in lines substantially parallel to one another and in columns substantially perpendicular to the lines. In this case, a fuel rod is held in a substantially rectangular mesh of a spacer grid. A fuel rod in this case is held in the center of the mesh.

Furthermore, it proves to be favorable that the area of an opening of a mesh in the first region is on average smaller than in the second region. In this case, the average opening of the mesh is obtained essentially from the total area of the mesh openings divided by the number of meshes in the respective region. In particular, the smaller meshes are located in the first region and the larger meshes in the second region.

The mesh size (i.e. the opening of a mesh) is therefore in each case favorably adapted to the configuration of the fuel rods in the first region and/or the second region. Such an adaptation is advantageously supplemented by appropriate spacer elements—for example knobs or springs.

Other features which are considered as characteristic for the invention are set forth in the appended claims.

Although the invention is illustrated and described herein as embodied in a fuel element with fuel rods for a boiling water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
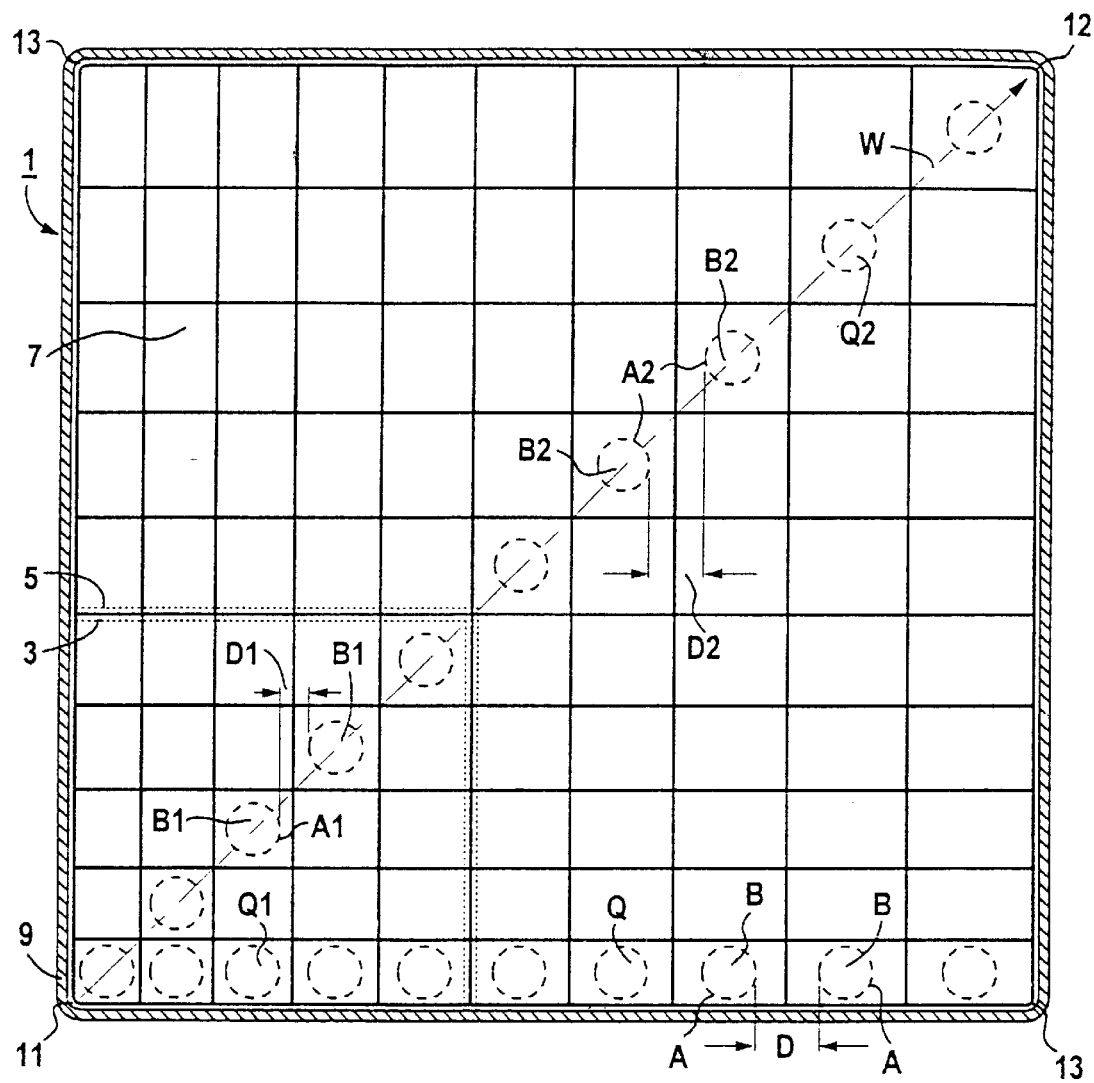
FIG. 1 is a diagrammatic, sectional view of a first embodiment of a fuel element in which a distance between outer surfaces of in each case two adjacent fuel rods increases strictly monotonically and the fuel rods have an identical diameter.

In all the figures of the drawing, sub-features and integral parts that correspond to one another bear the same reference symbol in each case. Referring now to the figures of the drawing in detail and first, particularly, to FIG. 1 thereof, there is shown in a sectional view of an exemplary embodiment of a fuel element 1 shown transversely with respect to a fuel-element axis with fuel rods B and a spacer. In this case, the fuel rods B are disposed substantially parallel to the fuel-element axis. The axis is perpendicular to a polygonal internal cross section 7 of the fuel element 1, which in this embodiment is bounded by an inner edge of a fuel-element box 9. The fuel rods B are thus also disposed substantially perpendicularly to the internal cross section 7, which is square in this embodiment, and pass through the internal cross section 7 over an area which is in each case determined by a cross section Q of the fuel rod B. A sum of all the cross sections Q1 in a first region 3 defines an area through which the fuel rods B1 pass. A remaining area defines a free area of the first region 3. A sum of all the cross sections Q2 defines an area in a second region 5 through which the fuel rods B2 pass.

The first region 3 and the second region 5 together form the internal cross section 7. In this case, the first region 3 forms a first corner 11 of the internal cross section 7. Other corners 12, 13 of the internal cross section 7, in particular the corner 12 opposite the first corner 11, are formed by the second region 5. Since, in the exemplary embodiment shown, a distance D between outer surfaces A1, A2 of in each case two adjacent fuel rods B1, B2 increases monotonically in particular along a diagonal W of the internal cross section 7 of the fuel element 1 starting from the first corner 11 of the fuel element 1 toward the opposite corner 12. A ratio of the free area of the internal cross section 7 to the area through which the fuel rods B1, B2 pass is smaller in the first region 3 than in the second region 5.

In particular, a distance D1 between the outer surfaces A1 of in each case two adjacent fuel rods B1 in the first region 3 is on average smaller than a distance D2 between the outer surfaces A2 of in each case two adjacent fuel rods B2 in the second region 5. In this case, the cross section Q of the fuel rod B is constant over the entire internal cross section 7 of the fuel element 1. However, as the graph below the fuel element 1 in FIG. 1 shows, the distance Di between in each case two immediately adjacent fuel rods B1, B2—that is the "immediate-neighbor" distance—increases along the diagonal W of the internal cross section 7. The distance Di as a function of the path even increases linearly in this embodiment.

Figure 2:
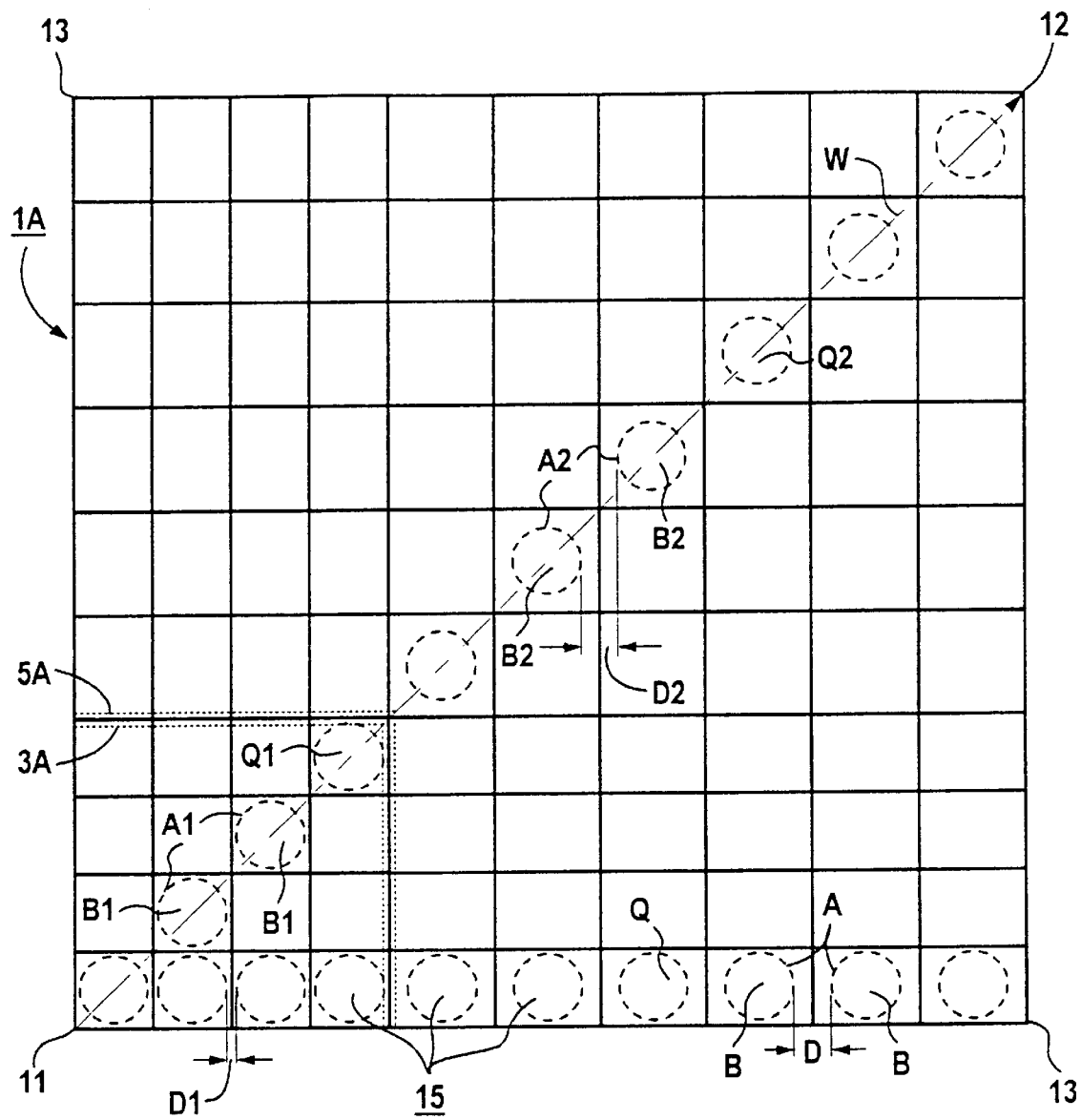
FIG. 2 is a sectional view of a second embodiment of the fuel element similar to that shown in FIG. 1 in which the distance increases monotonically.
Figure 2:
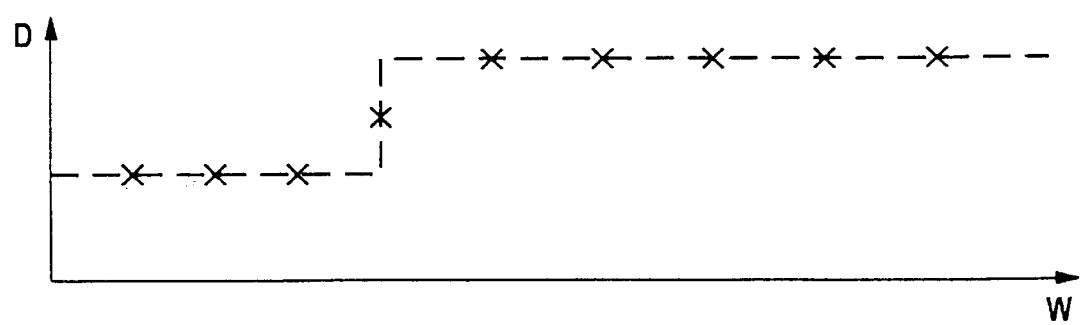

In the exemplary embodiment of a fuel element 1A shown in FIG. 2, according to the graph in FIG. 2, the distance D between the outer surfaces Ai of in each case two adjacent fuel rods Bi in one direction, starting from the first corner 11 of the fuel element 1 toward the opposite corner 12, does not increase strictly monotonically manner but only monotonically. In the first region 3A, the distance Di has a constant value D1 and then increases abruptly at the boundary to a second region 5A, in which the distance Di has a likewise constant, but larger value D2. This is illustrated by the plot of Di along the diagonal W in the graph in FIG. 2. In this embodiment, the distance D1 corresponds to the average distance between the outer surfaces A1 of in each case two adjacent fuel rods B1 in the first region 3A. Likewise, the distance D2 corresponds to the average distance between the outer surfaces A2 of two adjacent fuel rods B2 in the second region 5A. In both of the exemplary embodiments in FIGS. 1 and 2, all of the fuel rods B of the fuel element 1 have the same cross section Qi and thus the same diameter.

FIG. 2 shows an embodiment of the fuel element 1A essentially with a fuel-rod bundle 15 with 10×10 positions for the fuel rods B—again as a section view transversely to the fuel-element axis. However, the representation in FIG. 2 applies in just the same way to a pressurized-water-reactor fuel element. In a pressurized-water-reactor fuel element, a corresponding fuel-rod bundle would contain, for example, 17×17 or 18×18 of the fuel rods B, with control rods disposed between the fuel rods B. In this case, for example, the fuel element according to U.S. Pat. No. 4,849,161 may be taken as a basis, the configuration of the fuel rods being modified in the manner according to the invention—in a segment, for example, as in FIG. 2.

Figure 3:
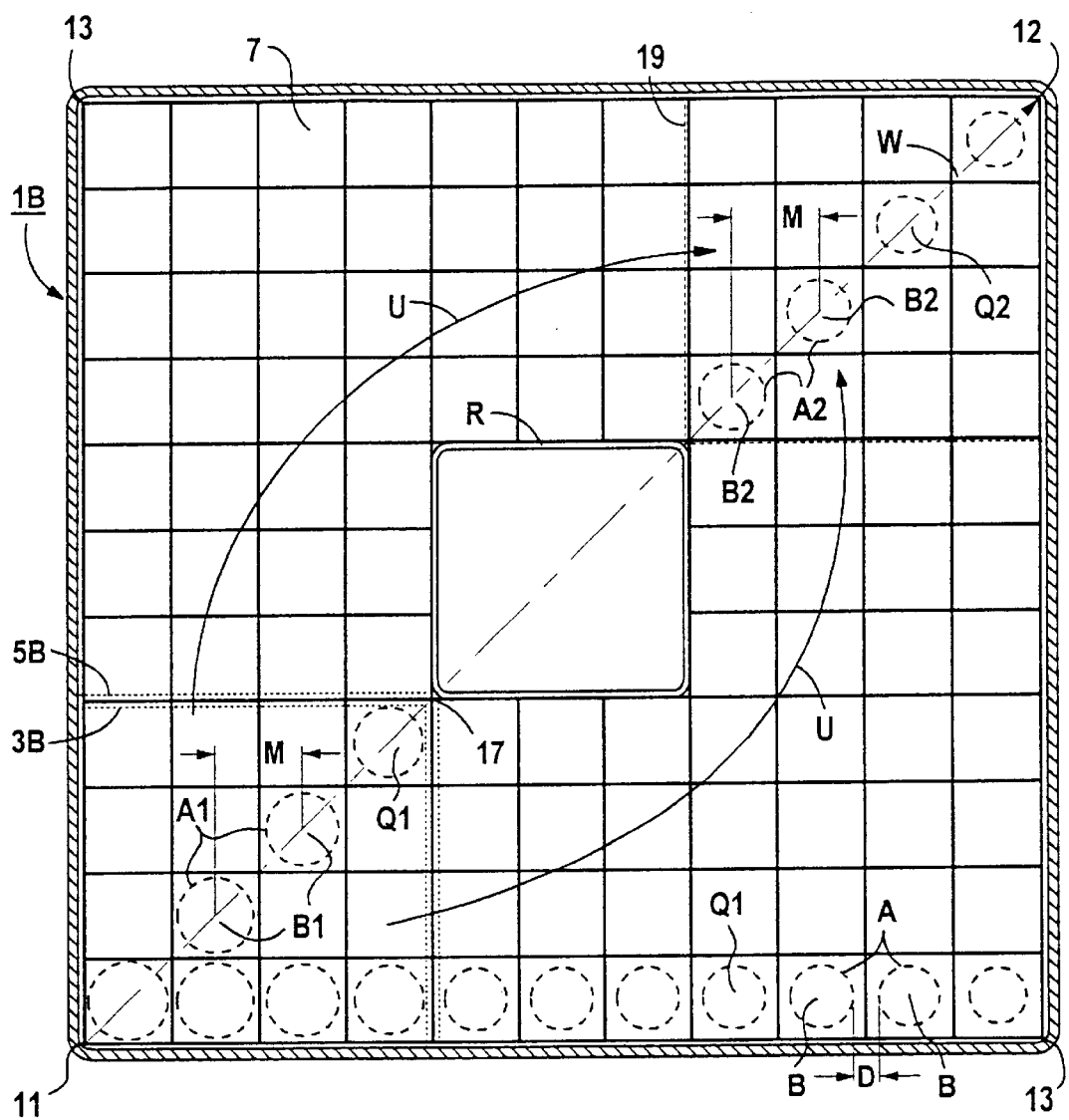
FIG. 3 is a sectional view of a third embodiment of the fuel element with a central water tube, a diameter of the fuel rods varying and the distance increasing convexly.
Figure 3:
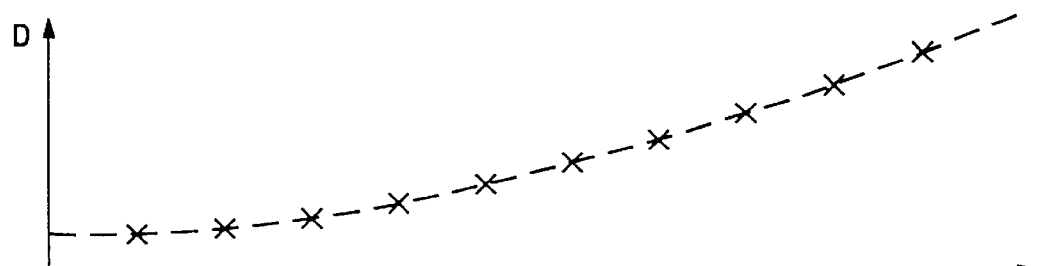

In the exemplary embodiment of a fuel element 1B shown in FIG. 3, the distance Di between the outer surfaces of in each case two adjacent fuel rods Bi, starting from the first corner 11 of the fuel element 1 toward the corner 12, increases along the diagonal W of the internal cross section 7 in accordance with a convex function with respect to the path along the diagonal W (see the graph in FIG. 3). In the embodiment 1B, although a distance M between centers of two adjacent fuel rods B1 in the first region 3B is the same as the distance M between centers of two adjacent fuel rods B2 in the second region 5B, the cross section Q1 of the fuel rod B1 in the first region 3B has a greater value than the cross section Q2 of the fuel rod B2 in the second region 5B. This leads to the convex increase (shown in the graph in FIG. 3) in the distance Di along the diagonal W of the internal cross section 7 in the embodiment 1B of the fuel element.

In the embodiments of the fuel element 1, 1A and 1B that are shown in FIGS. 1 to 3, in each case the fuel rods Bi are disposed over the internal cross section 7 virtually in mirror symmetry relative to the diagonal W, going from the first corner 11 to an opposite corner 12, of the internal cross section 7 of the respective embodiment 1, 1A, 1B, the internal cross section 7 in each case being substantially square.

In addition, the embodiment of the fuel element 1B shown in FIG. 3 has a water tube R, which is substantially parallel to the fuel rods B of this embodiment. According to the explained configuration of the fuel rods B1 in the first region 3B and of the fuel rods B2 in the second region 5B, the ratio of the free area of the internal cross section 7 to the area through which fuel the fuel rods B1 pass in the first region 3B is smaller than the corresponding ratio of the free area of the internal cross section 7 to the area through which the fuel rods B2 pass in the second region 5B. Since the first region 3B forms the first corner 11 of the internal cross section and in particular borders on the water tube R with an inner corner 17 which is opposite the first corner 11, the open cross section of flow in the first region 3B is substantially smaller than in the second region 5B and in particular in a section 19 of the second region 5B. The section 19 certainly has the same base area as the first region 3B. However, since the ratio of the free area of the internal cross section 7 to the area through which the fuel rods B2 pass is greater in the section 19 than in the first region 3B, the cross section of flow in the section 19 is greater than in the first region 3B.

These differences result in a pressure gradient from the first region 3B to the second region 5B, in particular to the section 19. This leads to a redistribution U of the flow of a coolant from the first region 3B to the section 19—that is into the region 5B. In particular, the steam portion present in a two-phase flow escapes especially quickly into the second region 5B, since it has a substantially smaller mass moment of inertia than the liquid portion of the coolant. Depending on the selection of an increase in the distance Di in one direction, in particular along the diagonal W, the redistribution U can be accurately metered. Examples of the different increase in a distance D is shown in each case in a graph in FIGS. 1, 2, 3 and 4.

Figure 4:
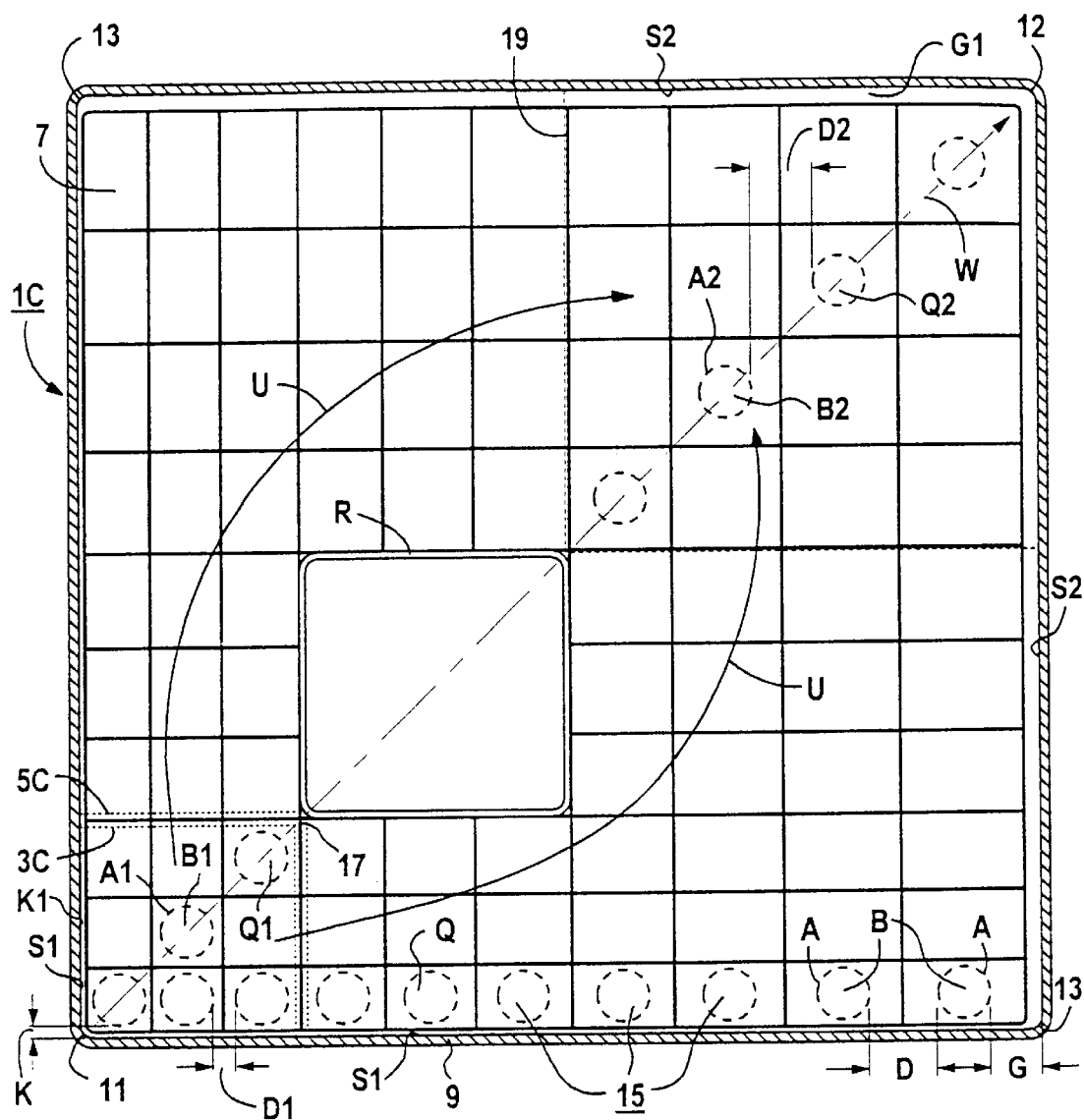
FIG. 4 is a sectional view of a fourth embodiment of the fuel element with an eccentric water tube and a fuel-rod bundle disposed eccentrically to the axis of the fuel element.
Figure 4:
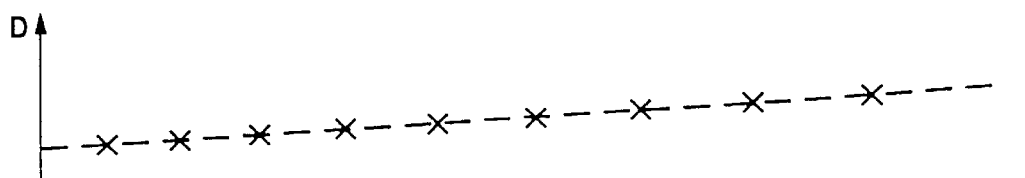

FIG. 4 shows a further exemplary embodiment of a fuel element 1C. In this case, the fuel element 1C has the water tube R sitting eccentrically relative to the fuel-element axis. In addition, the fuel-rod bundle 15 as an entity is moved along the diagonal W of the internal cross section 7 of the fuel element 1C in the direction of a first region 3C or the first corner 11, that is away from the opposite corner 12. The result of this measure in this embodiment is that the ratio of the free area of the internal cross section 7 to the area through which the fuel rods B1 pass is smaller in the first region 3C than in a second region 5C. This is because, in this case, a gap K1 between an outer margin of the fuel-rod bundle 15 and a side S1 starting from the first corner 11 is smaller than a distance G1 of an outer margin of the fuel-rod bundle 15 from a second side S2 which starts from another corner 12 lying opposite the first corner 11. In this case, in particular the fuel rod B adjacent to the first side S1 is at a smaller distance K from the first side S1 than the fuel rod B which is adjacent to a second side S2 and is at a distance G from this second side S2.

Since a redistribution U of the coolant flow from the first region 3C into the second region 5C is partly already achieved in this exemplary embodiment 1C by a displaced fuel-rod bundle 15 as an entity along the diagonal W towards the first region 3C, a change in the distance D between the outer surfaces A of two adjacent fuel rods B can be less pronounced than would be necessary, for example, in the embodiment in FIG. 1 in order to achieve approximately the same redistribution. This can be seen for the exemplary embodiment 1C from the graph in FIG. 4, in which the distance D increases linearly as a function of the path along the diagonal W. However, the increase in D as a function of the path along W is less than in the exemplary embodiment of the fuel element 1 shown in FIG. 1.

I claim:

1. A fuel element, comprising:

a fuel element body having a fuel element axis, a polygonal internal cross section perpendicular to said fuel-element axis, a first region, and a second region; and fuel rods having outer surfaces disposed substantially parallel to said fuel-element axis and substantially perpendicular to said polygonal internal cross section in said fuel element body, in said first region a ratio of a free area of said polygonal internal cross section to an area through which said fuel rods pass in said first region is smaller than in said second region, said first region forming a first corner of said polygonal internal cross section and said second region forming second corners of said polygonal internal cross section, and a distance between said outer surfaces of each two adjacent fuel rods increasing monotonically in any one direction along said polygonal internal cross section starting from said first corner of said fuel element body.

2. The fuel element according to claim 1, wherein said distance between said outer surfaces is on average smaller in said first region than in said second region.

3. The fuel element according to claim 1, wherein said fuel rods have identical diameters.

4. The fuel element according to claim 1, wherein said distance between said outer surfaces starting from said first corner increases in said one direction in accordance with a linear, convex or concave function.

5. The fuel element according to claim 1, wherein said fuel rods form a configuration over said polygonal internal cross section that is substantially in mirror symmetry relative to a diagonal of said polygonal internal cross section starting from said first corner of said polygonal cross section.

6. The fuel element according to claim 1, wherein said polygonal internal cross section is square shaped.

7. The fuel element according to claim 1, wherein said fuel element body has a first side and a second side, said fuel rods include a first fuel rod adjacent said first side and a second fuel rod adjacent said second side, said first fuel rod starting from said first corner is at a first distance from said first side which is smaller than a second distance of said second fuel rod from said second side.

8. The fuel element according to claim 1, including a water-tube configuration disposed in said fuel element body and disposed substantially parallel to said fuel rods.

9. The fuel element according to claim 8, wherein said first region is square shaped and borders said water-tube configuration, said water-tube configuration having a corner lying opposite said first corner.

10. The fuel element according to claim 1, wherein said second region is polygonal, and has a section forming a corner of said second region, said corner of said second region being opposite said first corner, a ratio of a free area of said polygonal internal cross section in said section to an area through which said fuel rods pass through said section is greatest.

11. The fuel element according to claim 1, wherein:
said fuel element body is a grid divided up by spacer grids forming a plurality of rectangular meshes, each of said rectangular meshes having a mesh opening formed therein;
said fuel rods are disposed in lines substantially parallel to one another and in columns substantially perpendicular to said lines; and
at least one of said fuel rods being disposed in one of said rectangular meshes.

12. The fuel element according to claim 11, wherein an area of said mesh opening of said rectangular meshes in said first region is on average smaller than in said second region.

13. The fuel element according claim 8, wherein said water-tube configuration is laterally offset from said fuel-element axis.

14. The fuel element according to claim 1, wherein said fuel rods have outer surfaces disposed parallel to said fuel-element axis and perpendicular to said polygonal internal cross section in said fuel element body.

15. A fuel element, comprising:
a fuel element body having a fuel element axis and an internal cross section perpendicular to said fuel-element axis, a first corner and second corners; and
fuel rods having outer surfaces disposed substantially parallel to said fuel-element axis and substantially perpendicular to said internal cross section of said fuel element body, said first corner having a ratio of a free area of said internal cross section to an area through which said fuel rods pass being smaller than said second corners and a distance between said outer surfaces of said fuel rods increasing monotonically in any one direction perpendicular to said fuel element axis starting from said first corner of said fuel element body.

16. The fuel element according to claim 15, wherein said distance between said outer surfaces of said fuel rods is on average smaller for fuel rods in said first corner than for fuel rods in said second corner.

17. The fuel element according to claim 15, wherein said fuel rods-have identical diameters.

18. The fuel element according to claim 15 wherein said distance between said outer surfaces starting from said first corner increases in said one direction in accordance with a linear, convex or concave function.

* * * * *